(12) United States Patent  
Mukasa

(10) Patent No.: US 12,529,839 B2
(45) Date of Patent: Jan. 20, 2026

(54) OPTICAL FIBER

(71) Applicant: FURUKAWA ELECTRIC CO., LTD., Tokyo (JP)

(72) Inventor: Kazunori Mukasa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 294 days.

(21) Appl. No.: 18/481,336

(22) Filed: Oct. 5, 2023

(65) Prior Publication Data

US 2024/0027679 A1    Jan. 25, 2024

Related U.S. Application Data

(63) Continuation of application No. PCT/JP2022/015633, filed on Mar. 29, 2022.

(30) Foreign Application Priority Data

Apr. 8, 2021  (JP) .................................. 2021-065905

(51) Int. Cl.
*G02B 6/02* (2006.01)
*G02B 6/036* (2006.01)

(52) U.S. Cl.
CPC ..... *G02B 6/03622* (2013.01); *G02B 6/02009* (2013.01); *G02B 6/036* (2013.01)

(58) Field of Classification Search
CPC ............ G02B 6/02009; G02B 6/02019; G02B 6/036; G02B 6/03622; G02B 6/03627
See application file for complete search history.

(56) References Cited

U.S. PATENT DOCUMENTS 6,266,467 B1 * 7/2001 Kato .................. G02B 6/03633
385/127
6,343,175 B1 * 1/2002 Sasaoka ............. G02B 6/03627
385/127

(Continued)

FOREIGN PATENT DOCUMENTS

JP  2003-66259 A    3/2003
JP  2009-122277 A   6/2009

(Continued)

OTHER PUBLICATIONS

International Search Report issued May 10, 2022 in PCT/JP2022/015633 filed on Mar. 29, 2022, 2 pages.

*Primary Examiner* — Ryan A Lepisto
(74) *Attorney, Agent, or Firm* — Oblon, McClelland, Maier & Neustadt, L.L.P.

(57) ABSTRACT

An optical fiber includes: a core portion; a side core layer circumferentially surrounding the core portion; a cladding portion circumferentially surrounding the side core layer; and a coating layer circumferentially surrounding the cladding portion. When an average maximum relative refractive-index difference of the core portion to an average refractive index of the cladding portion is $\Delta 1$, a relative refractive-index difference of an average refractive index of the side core layer to the average refractive index of the cladding portion is $\Delta 2$, a relative refractive-index difference of the average refractive index of the cladding portion to pure silica glass is $\Delta$Clad, $\Delta 1 > \Delta$Clad $> \Delta 2$ and $0 > \Delta 2$ hold, the $\Delta 1$ is 0.18% or more and 0.24% or less, the $\Delta 2$ is −0.27% or more and −0.12% or less, and ($\Delta 1 - \Delta 2$) is 0.36% or more and 0.45% or less.

11 Claims, 5 Drawing Sheets

(56) References Cited

U.S. PATENT DOCUMENTS

| | | | |
|---|---|---|---|
| 6,658,190 B2* | 12/2003 | Hirano | G02B 6/02019 385/124 |
| 6,661,958 B2* | 12/2003 | Hirano | G02B 6/02257 385/127 |
| 7,046,884 B2* | 5/2006 | Sasaoka | G02B 6/02271 385/127 |
| 7,689,085 B1 | 3/2010 | Mishra | |
| 8,428,409 B2* | 4/2013 | Nicholson | H01S 3/06733 385/127 |
| 8,655,133 B2* | 2/2014 | Yamamoto | G02B 6/02019 398/208 |
| 8,811,784 B2* | 8/2014 | Mukasa | G02B 6/02333 398/142 |
| 8,861,915 B2* | 10/2014 | Mukasa | G02B 6/02 385/127 |
| 9,128,234 B2* | 9/2015 | Mukasa | H04J 14/052 |
| 9,128,237 B2* | 9/2015 | Mukasa | G02B 6/02047 |
| 9,291,771 B2 | 3/2016 | Kawaguchi et al. | |
| 9,964,697 B2* | 5/2018 | Maruyama | G02B 6/125 |
| 10,422,948 B2* | 9/2019 | Maruyama | G02B 6/03627 |
| 10,578,796 B2* | 3/2020 | Nagasu | C03C 25/1065 |
| 10,983,267 B2* | 4/2021 | Downie | G02B 6/02019 |
| 11,048,039 B2* | 6/2021 | Maruyama | G02B 6/02004 |
| 11,099,322 B2* | 8/2021 | Suzuki | G02B 6/02004 |
| 11,624,871 B2* | 4/2023 | Mukasa | C03C 13/045 385/123 |
| 11,719,879 B2* | 8/2023 | Mukasa | G02B 6/02009 385/123 |
| 11,860,407 B2* | 1/2024 | Mukasa | G02B 6/02004 |
| 11,880,064 B2* | 1/2024 | Mukasa | C03C 25/1065 |
| 12,032,203 B2* | 7/2024 | Munige | G02B 6/02395 |
| 2001/0017967 A1 | 8/2001 | Hirano et al. | |
| 2009/0123122 A1* | 5/2009 | Mukasa | G02B 6/03644 385/128 |
| 2011/0211788 A1 | 9/2011 | Yamamoto et al. | |
| 2013/0114935 A1 | 5/2013 | Bookbinder et al. | |
| 2017/0075060 A1 | 3/2017 | Kawaguchi et al. | |
| 2023/0244027 A1* | 8/2023 | Mukasa | G02B 6/03627 385/124 |

FOREIGN PATENT DOCUMENTS

| | | |
|---|---|---|
| JP | 2011-197667 A | 10/2011 |
| JP | 2013-518312 A | 5/2013 |
| JP | 6500451 B2 | 4/2019 |
| JP | 6527973 B2 | 6/2019 |
| WO | WO 00/62106 A1 | 10/2000 |
| WO | WO 2015/186719 A1 | 12/2015 |

* cited by examiner

OPTICAL FIBER

REFERENCE TO RELATED APPLICATION(S)

This application is a continuation of International Application No. PCT/JP2022/015633, filed on Mar. 29, 2022 which claims the benefit of priority of the prior Japanese Patent Application No. 2021-065905, filed on Apr. 8, 2021, the entire contents of which are incorporated herein by reference.

BACKGROUND OF THE INVENTION

The present disclosure relates to an optical fiber.

Optical fibers that have a W-shaped refractive index profile have been actively studied (JP 6500451 B2, JP 6527973 B2, JP 2003-66259 A, and JP 2009-122277 A). The W-shaped refractive index profile is employed, for example, to increase an effective core area of an optical fiber. An optical fiber having a large effective core area suppresses generation of a nonlinear optical effect in the optical fiber, and therefore can be suitably used as, for example, a long-distance optical transmission line. Note that, in some cases, the effective core area is described as Aeff.

JP 2009-122277 A discloses a technology in which although the effective core area is increased to 150 μm² or more and a macrobending loss being traded off against the effective core area is reduced, a cable cut-off wavelength is set to approximately 1.45 μm or less.

SUMMARY OF THE INVENTION

However, achievement of an optical fiber achieving an appropriately large effective core area of approximately 105 μm² or more and 130 μm² or less, having a cable cut-off wavelength of 1530 nm or less and a bending loss (macrobending loss) at a wavelength of 1550 nm when bent at a diameter of 30 mm is 1 dB/m or less requires consideration.

Therefore, it is desirable to provide an optical fiber that achieves both of a single-mode characteristic and a low bending loss while appropriately increasing the effective core area.

In some embodiments, an optical fiber includes: a core portion; a side core layer circumferentially surrounding the core portion; a cladding portion circumferentially surrounding the side core layer; and a coating layer circumferentially surrounding the cladding portion. When an average maximum relative refractive-index difference of the core portion to an average refractive index of the cladding portion is Δ1, a relative refractive-index difference of an average refractive index of the side core layer to the average refractive index of the cladding portion is Δ2, a relative refractive-index difference of the average refractive index of the cladding portion to pure silica glass is ΔClad, Δ1>ΔClad>Δ2 and 0>Δ2 hold, the Δ1 is 0.18% or more and 0.24% or less, the Δ2 is −0.27% or more and −0.12% or less, (Δ1−Δ2) is 0.36% or more and 0.45% or less, when a core diameter of the core portion is 2a and an outer diameter of the side core layer is 2b, b/a is 2.5 or more and 5 or less, an effective core area at a wavelength of 1550 nm is 105 μm² or more and 130 μm² or less, a cable cut-off wavelength is 1530 nm or less, and a macrobending loss at a wavelength of 1550 nm when bent at a diameter of 30 mm is 1 dB/m or less.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Figure 1:
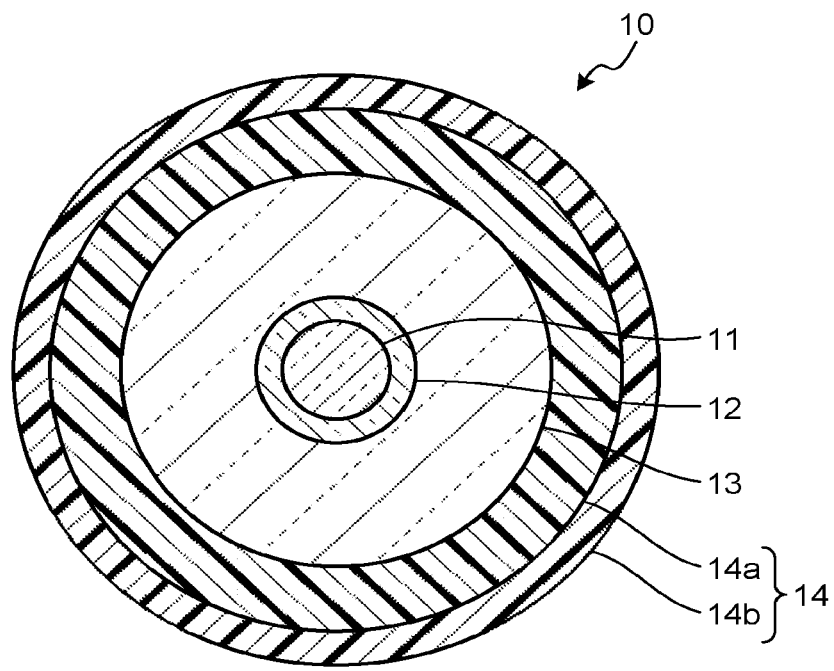
FIG. 1 is a schematic cross-sectional view of an optical fiber according to an embodiment.

Hereinafter, embodiments of the disclosure will be described in detail with reference to the drawings. Note that the disclosure is not limited to the embodiments described below. Furthermore, in the drawings, the same or corresponding component elements are appropriately denoted by the same reference numerals. Furthermore, in the present specification, a cut-off wavelength or an effective cut-off wavelength refers to a cable cut-off wavelength (λcc) that is defined in ITU-T G.650.1 by the International Telecommunication Union (ITU). In addition, terms that are not specifically defined in the present specification shall conform to the definitions and measurement methods in G.650.1 and G.650.2.

EMBODIMENTS

FIG. 1 is a schematic cross-sectional view of an optical fiber according to an embodiment. An optical fiber is made of silica-based glass, and includes a core portion 11, a side core layer 12 that circumferentially surrounds the core portion 11, and a cladding portion 13 that circumferentially surrounds the side core layer 12. Note that a portion of the optical fiber 10 including the core portion 11, the side core layer 12, and the cladding portion 13 is a portion that is made of glass in the optical fiber, and may be referred to as a glass optical fiber. In addition, the optical fiber 10 includes a coating layer 14 that circumferentially surrounds the cladding portion 13. The coating layer 14 includes a primary layer 14a that circumferentially surrounds the cladding portion 13 and a secondary layer 14b that circumferentially surrounds the primary layer 14a. The optical fiber including the coating layer 14 may be referred to as a coated optical fiber.

Figure 2:
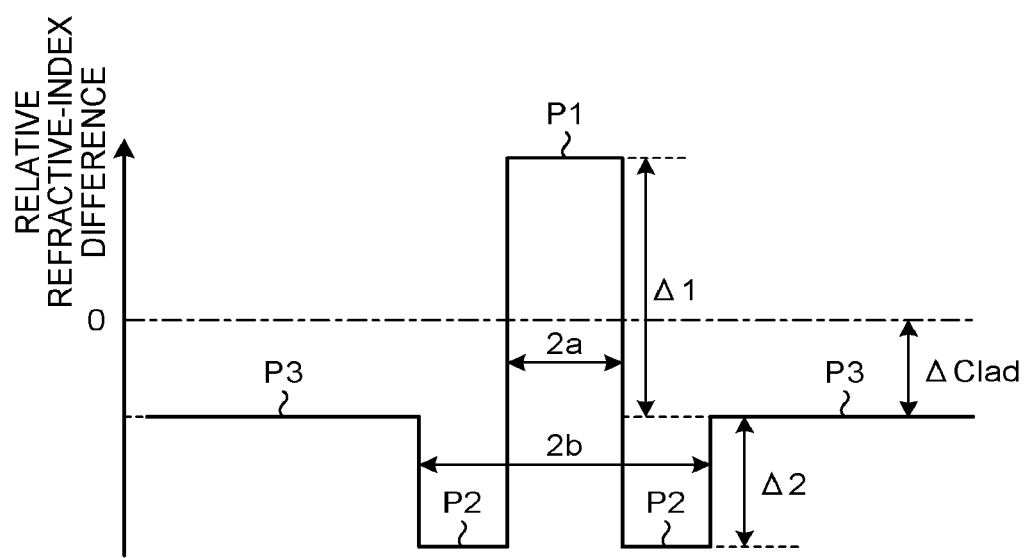
FIG. 2 is a graph of a refractive index profile of the optical fiber according to the embodiment.

FIG. 2 is a graph of a refractive index profile of the optical fiber 10. A profile P1 is a refractive index profile of the core portion 11, and has a so-called step shape. A profile P2 is a refractive index profile of the side core layer 12. A profile P3 is a refractive index profile of the cladding portion 13.

Here, the refractive index profile of the core portion 11 has not only the step shape having an ideal geometrical shape, but also a not-flat uneven shape at the top portion due to a manufacturing characteristic or a shape sloped from the top portion, in some cases. In this condition, a refractive index of a region substantially flat at the top of the refractive index profile within the range of a core diameter 2a of the core portion 11 in manufacturing design is an index for determining Δ1. Note that it has been confirmed that even when the region substantially flat is considered to be divided into a plurality of portions or when definition of the region substantially flat is made difficult due to a continuous change, a characteristic closer to a desired characteristic can be provided, as long as at least any portion of the core portion other than a portion having a refractive index rapidly changes toward an adjacent layer falls within the range of Δ1 described below and a difference in Δ between the maximum value and the minimum value is within a certain value ±30%, without any problems.

Structural parameters of the optical fiber 10 will be described. As described above, the core diameter of the core portion 11 is denoted by 2a. An outer diameter of the side core layer 12 is denoted by 2b.

Furthermore, a relative refractive-index difference (maximum relative refractive-index difference) of an average maximum refractive index of the core portion 11 to an average refractive index of the cladding portion 13 is Δ1. A relative refractive-index difference of an average refractive index of the side core layer 12 to the average refractive index of the cladding portion 13 is Δ2. Note that the average maximum refractive index of the core portion 11 is a radial average value of the refractive index of the region substantially flat at the top of the refractive index profile. The average refractive index of the side core layer 12 or the cladding portion 13 is an average refractive index value in a radial direction of the refractive index profile.

Furthermore, a relative refractive-index difference of the average refractive index of the cladding portion 13 to a refractive index of pure silica glass is ΔClad. Here, the pure silica glass is an extremely high-purity silica glass that substantially contains no dopant changing the refractive index and has a refractive index of approximately 1.444 at a wavelength of 1550 nm. In FIG. 2, the relative refractive-index difference of the pure silica glass to the average refractive index of the cladding portion 13 is represented by an alternate long and short dash line.

The values Δ1, Δ2, and ΔClad satisfy Δ1>ΔClad>Δ2 and 0>Δ2. In other words, the optical fiber 10 has the W-shaped refractive index profile. Furthermore, FIG. 2 illustrates ΔClad having a negative value of less than 0%, but ΔClad may be 0% or more.

Constituent materials of the optical fiber 10 will be described. The core portion 11 may be made of silica-based glass containing a dopant for adjusting the refractive index to increase the refractive index. For example, the core portion 11 includes at least one, for example, two or more, of germanium (Ge), chlorine (Cl), fluorine (F), potassium (K), and sodium (Na), as the dopant. F is a dopant that reduces the refractive index of silica glass, and (Ge), Cl, K, and Na are dopants to increase the refractive index of silica glass. Note that the core portion 11 may not include Ge. "Not include Ge" includes both of the core portion 11 including the dopant other than Ge and the core portion 11 made of pure silica glass. When the core portion 11 does not include Ge, a transmission loss due to Rayleigh scattering can be reduced.

Meanwhile, the side core layer 12 and the cladding portion 13 are made of silica-based glass to which only F and Cl, only F, or only Cl is added. The refractive index is adjusted with the dopants, therefore, Δ1>ΔClad>Δ2 and 0>Δ2 hold, and further, suitable ranges of Δ1, Δ2, and ΔClad which are described later is achieved. Note that the cladding portion 13 may be made of pure silica glass.

The primary layer 14a and the secondary layer 14b are made of resin. The resin is, for example, an ultraviolet curable resin. The ultraviolet curable resin is obtained by mixing various resin materials and additives such as an oligomer, diluent monomer, photopolymerization initiator, silane coupling agent, sensitizer, and lubricant. For the oligomer, conventionally known materials such as polyether-based urethane acrylate, epoxy acrylate, polyester acrylate, and silicone acrylate can be used. For the diluent monomer, conventionally known materials such as a monofunctional monomer and a polyfunctional monomer can be used. In addition, the additives are not limited to those described above, and conventionally known additives and the like used for the ultraviolet curable resin and the like can be widely used.

Both of primary layer thickness that is a layer thickness of the primary layer 14a and secondary layer thickness that is a layer thickness of the secondary layer 14b are 5 μm or more.

A primary elastic modulus that is an elastic modulus of the primary layer 14a is smaller than a secondary elastic modulus that is an elastic modulus of the secondary layer 14b. The primary elastic modulus and the secondary elastic modulus are also referred to as Young's modulus. These elastic moduli can be achieved by adjusting resin components, production conditions, and the like. Specifically, the elastic moduli of the primary layer 14a and the secondary layer 14b can be adjusted according to the type, molecular weight, and content of the oligomer, the type and added amount of the diluent monomer, or the type and content of the other components, curing conditions such as ultraviolet irradiation intensity, and the like, in the materials constituting the primary layer 14a and the secondary layer 14b.

In the optical fiber 10 configured as described above, Δ1 is 0.18% or more and 0.24% or less, Δ2 is −0.27% or more and −0.12% or less, (Δ1−Δ2) is 0.36% or more and or less, b/a is 2.5 or more and 5 or less, an effective core area at the wavelength of 1550 nm is 105 μm$^2$ or more and 130 μm$^2$ or less, the cable cut-off wavelength is 1530 nm or less, and a bending loss at the wavelength of 1550 nm when bent at a diameter of 30 mm is 1 dB/m or less. This configuration achieves the characteristics of the optical fiber 10 achieving both of a single-mode characteristic and a low bending loss while appropriately increasing the effective core area.

The results of study by the present inventors to achieve the optical fiber that achieves both of the single-mode characteristic and the low bending loss while appropriately increasing the effective core area will be described below.
Suitable Structural Parameters In order to achieve the optical fiber 10 having a low microbending loss with increased Aeff, the present inventors have intensively studied the structural parameters of the W-shaped refractive index profile and optical properties obtained by the structural parameters, by using simulation calculation or the like. In the following study, unless otherwise specified, Aeff is a value at the wavelength of 1550 nm. The bending loss is a value at the wavelength of 1550 nm when bent at a diameter of 30 mm.

Figure 3:
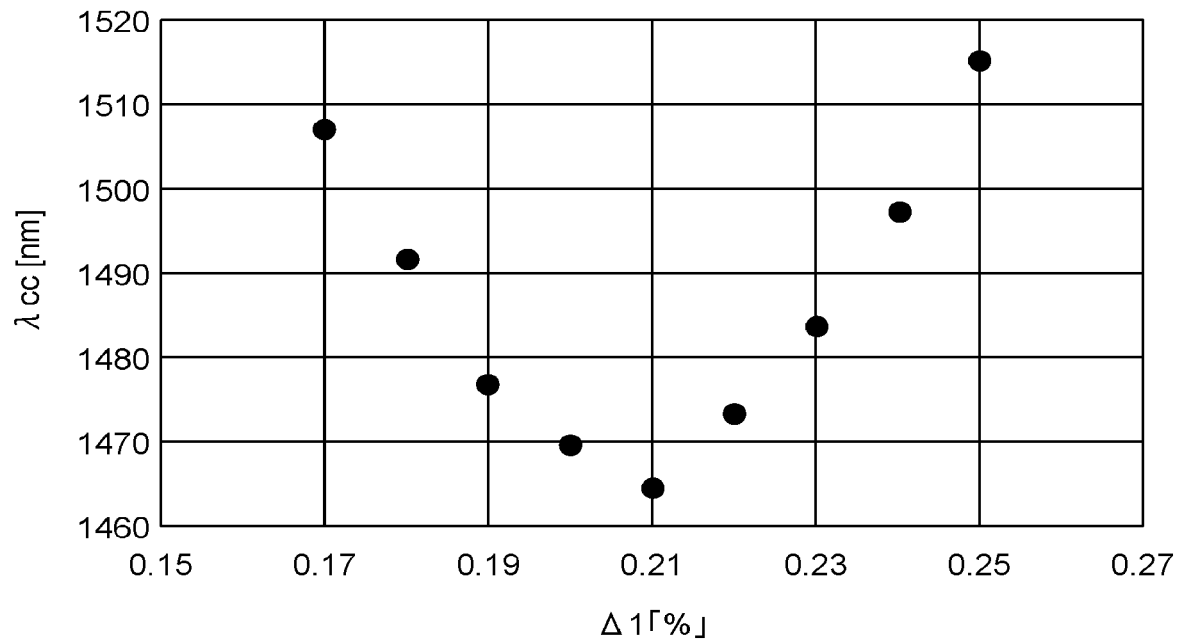
FIG. 3 is a graph illustrating an example of a relationship between Δ1 and cable cut-off wavelength.

First, Δ1 will be described. FIG. 3 is a graph illustrating an example of a relationship between Δ1 and the cable cut-off wavelength ($\lambda cc$). Note that the data of FIG. 3 shows that the core diameter $2a$ is adjusted to a range where Aeff is 120 $\mu m^2$ or more and 125 $\mu m^2$ or less, $\Delta 2$ is changed within a range of −0.27% or more and −0.12% or less, and b/a is changed within a range of 2.5 or more and 5 or less, where $\Delta 2$ and b/a are the other structural parameters. Here, the same $\Delta 1$ value takes different $\lambda cc$ values depending on the values of other structural parameters, and therefore, an average $\lambda cc$ value for the respective $\Delta 1$ values are illustrated in FIG. 3. From FIG. 3, it can be seen that there is an optimum range for $\Delta 1$ in order to set $\lambda cc$ to 1530 nm or less, or further 1500 nm or less. According to examination by the present inventors, even when Aeff was adjusted to a range of 105 $\mu m^2$ or more and 130 $\mu m^2$ or less, the same tendency was shown as in FIG. 3. From these, the present inventors have found that it is preferable for $\Delta 1$ to be 0.18% or more and 0.24% or less in order to stably set $\lambda cc$ to 1530 nm or less and further 1500 nm or less when Aeff is 105 $\mu m^2$ or more and 130 $\mu m^2$ or less.

Figure 4:
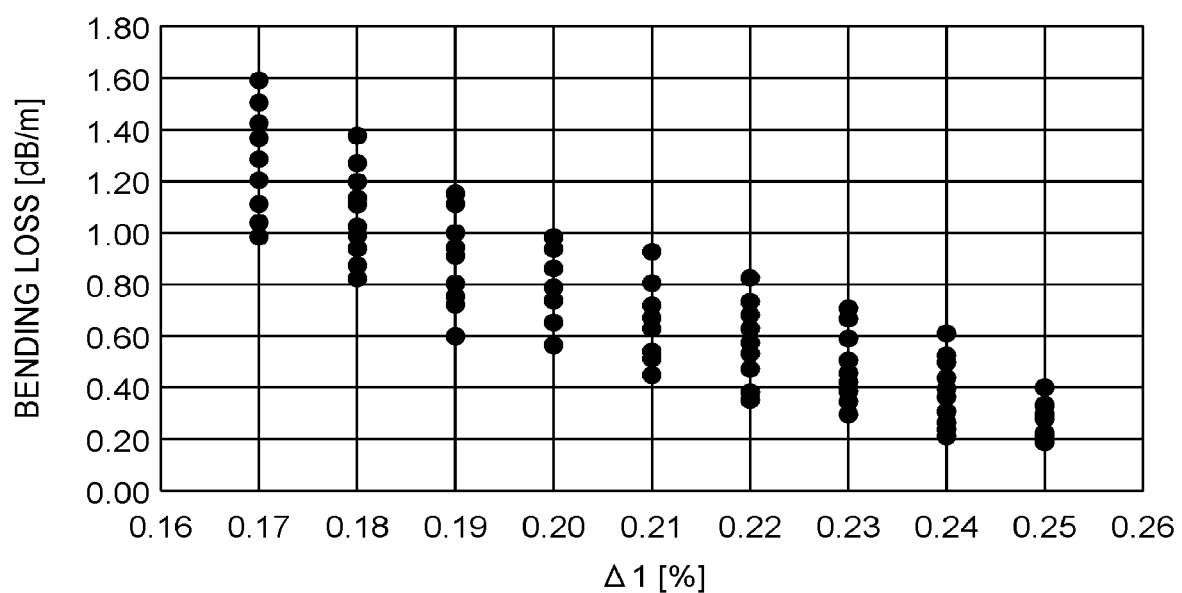
FIG. 4 is a graph illustrating an example of a relationship between Δ1 and bending loss.

FIG. 4 is a graph illustrating an example of a relationship between $\Delta 1$ and the bending loss. Note that the data of FIG. 4 shows that the core diameter $2a$ is adjusted to a range where Aeff is 105 $\mu m^2$ or more and 130 $\mu m^2$ or less, $\Delta 2$ is changed within a range of −0.27% or more and −0.12% or less, b/a is changed within a range of 2.5 or more and 5 or less, and $\lambda cc$ is 1500 nm or less, where $\Delta 2$ and b/a are the other structural parameters. The reason for $\lambda cc$ set to 1500 nm or less is to ensure stable single-mode characteristic at a wavelength of the C-band (e.g., 1530 nm to 1565 nm) regardless of variation in manufacturing the optical fiber 10.

As can be seen from FIG. 4, the bending loss tends to increase as $\Delta 1$ decreases. From these, the present inventors have found that it is preferable for $\Delta 1$ to be or more, more preferably 0.20% or more, in order to stably set the bending loss to 1 dB/m or less when Aeff is 105 $\mu m^2$ or more and 130 $\mu m^2$ or less.

Furthermore, the present inventors confirmed, for example, data of $\Delta 1$ at 0.21%, which is a value near the center of $\Delta 1$ in FIG. 2, and has found that ($\Delta 1-\Delta 2$) is a parameter other than $\Delta 1$ that affects the characteristics of the bending loss.

Figure 5:
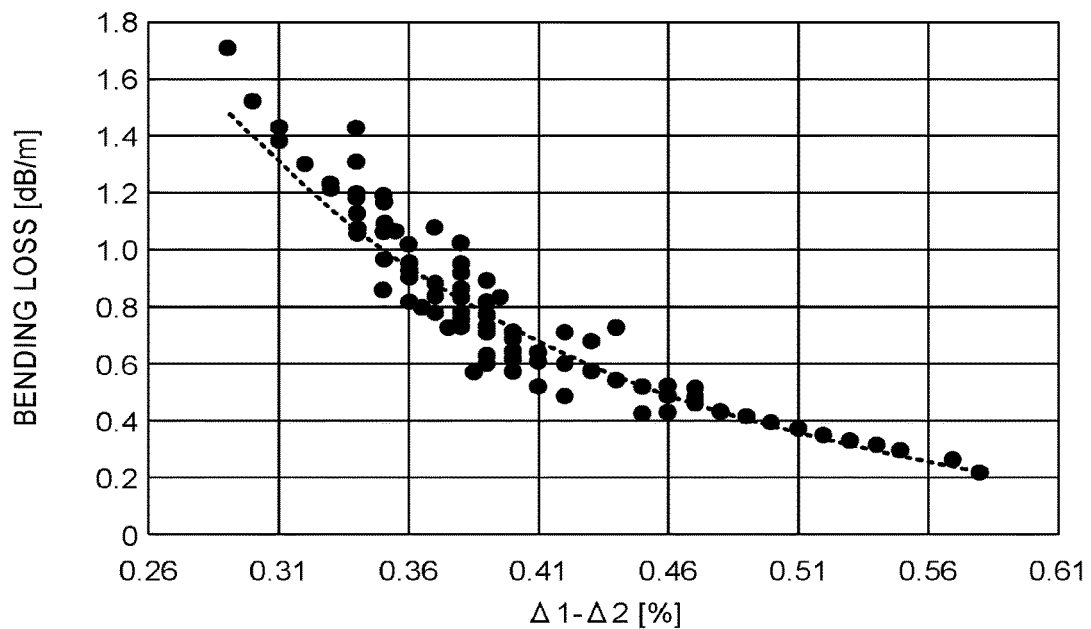
FIG. 5 is a graph illustrating an example of a relationship between (Δ1−Δ2) and the bending loss.

FIG. 5 is a graph illustrating an example of a relationship between ($\Delta 1-\Delta 2$) and the bending loss. Note that the data of FIG. 5 shows that the core diameter $2a$ is adjusted to a range where Aeff is 105 $\mu m^2$ or more and 130 $\mu m^2$ or less, $\Delta 1$ is adjusted to a range of 0.18% or more and or less, and $\lambda cc$ is 1500 nm or less. In particular, around a portion where a bending loss is 1 dB/m, the bending loss was obtained by increasing the range of adjusting Aeff. As can be seen from FIG. 5, the value of ($\Delta 1-\Delta 2$) is also an important factor of the bending loss. Specifically, as ($\Delta 1-\Delta 2$) falls below approximately the bending loss rapidly increases, and it becomes difficult to control the bending loss to 1 dB/m or less. From this result, $\Delta 1-\Delta 2$ is preferably 0.36% or more. In addition, when $\Delta 1$ is set to 0.18% or more and 0.24% or less, if $\Delta 2$ is less than −0.27%, it has been found that there is no solution that satisfies all of Aeff, $\lambda cc$, and the bending loss even if other parameters are optimized. Therefore, a suitable range of $\Delta 2$ is −0.27% to −0.12%. The reason why $\Delta 2$ is preferably −0.12% or less will be described later.

Figure 6:
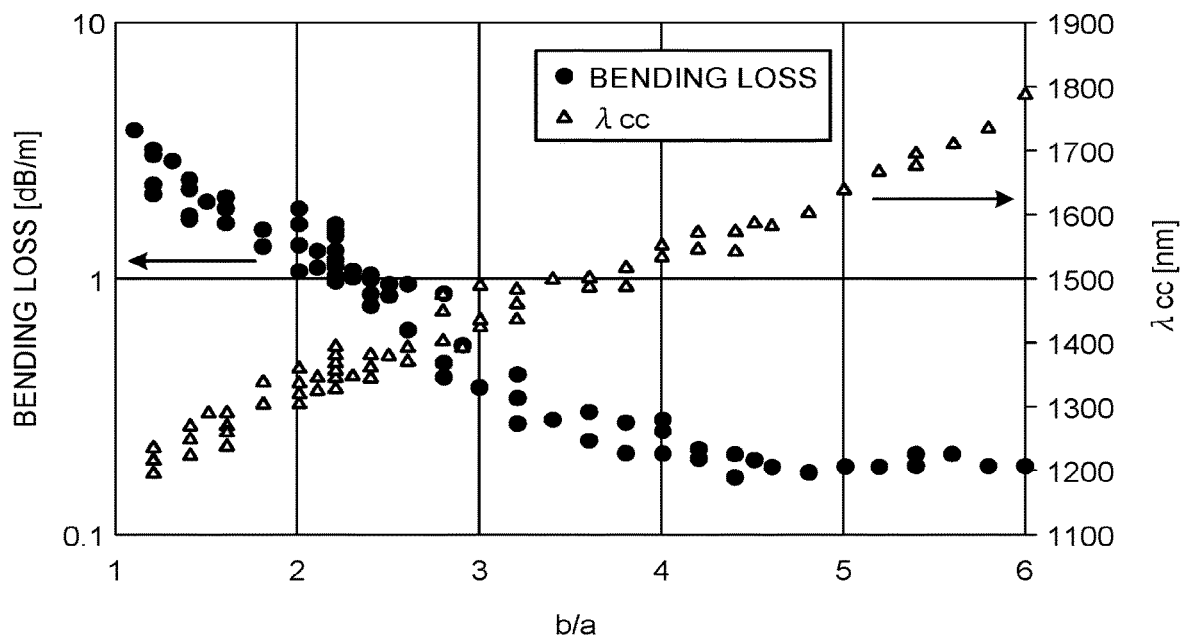
FIG. 6 is a graph illustrating an example of a relationship between b/a and the bending loss, and a relationship between b/a and the cable cut-off wavelength.

Next, b/a will be described. FIG. 6 is a graph illustrating an example of a relationship between b/a and the bending loss, and a relationship between b/a and the cable cut-off wavelength. Note that the data of FIG. 6 shows that the core diameter $2a$ is adjusted to a range where Aeff is 125 $\mu m^2$ or more and 130 $\mu m^2$ or less, $\Delta 1$ is adjusted to a range of 0.18% or more and 0.24% or less, and $\Delta 2$, which is the other structural parameter, is changed within a range of −0.27% or more and −0.12% or less. The reason for Aeff adjusted to the range of 125 $\mu m^2$ or more and 130 $\mu m^2$ or less is to set a value closer to the upper limit of the range of 105 $\mu m^2$ or more and 130 $\mu m^2$ or less and to set a condition in which the bending loss tends to be large, that is, to set a condition in which achievement of the low bending loss is made more difficult.

As can be seen from FIG. 6, the bending loss decreases as b/a increases, and when b/a is 2.5 or more, a bending loss of 1 dB/m or less is readily achieved. Note that in a range where Aeff is smaller, it is easy to achieve a bending loss of 1 dB/m or less even with a smaller b/a, but if b/a is 2.5 or more, it is preferable to stably provide a bending loss of 1 dB/m or less. However, even when b/a is larger than 3.9, the degree of reduction in bending loss due to the increase in b/a is small, and b/a may be 3.9 or less.

Meanwhile, as can be seen from FIG. 6, when b/a is 4 or more in the range where Aeff is 125 $\mu m^2$ or more and 130 $\mu m^2$ or less, it is difficult to set $\lambda cc$ to 1530 nm. Therefore, b/a is more preferably 3.9 or less. In addition, it has been confirmed that in a range where Aeff is smaller, when b/a is 5 or less, $\lambda cc$ of 1530 nm or less can be achieved.

Next, the microbending loss will be described. The microbending loss is also an important factor in the optical fiber with increased Aeff, similarly to the bending loss (macrobending loss). Therefore, examination was performed by simulation calculation and experiment, for the microbending loss measured using a sandpaper method that is similar to a fixed diameter drum method defined in JIS C6823: 2010. Note that measurement wavelength for the microbending loss was set to 1550 nm. The simulation calculation based on the following non-patent literature was used to examine the microbending loss: "Tamas Mihalffy et al., Combined Mechanical-Optical Simulation to Predict Microbending Loss of Single Mode Fibers, OECC 2019, WP4-C1." In a measurement method using the sandpaper method, a difference between the transmission loss of an optical fiber to be measured in a state A and the optical fiber in a state B was defined as the microbending loss. In the state A, the optical fiber having a length of 500 m is wound at a tension of 100 gf in a single layer around a fixed diameter bobbin on which #1000 sandpaper is wrapped so that the optical fiber does not overlap, and in the state B, the optical fiber is coiled so that no lateral pressure is applied.

Figure 7:
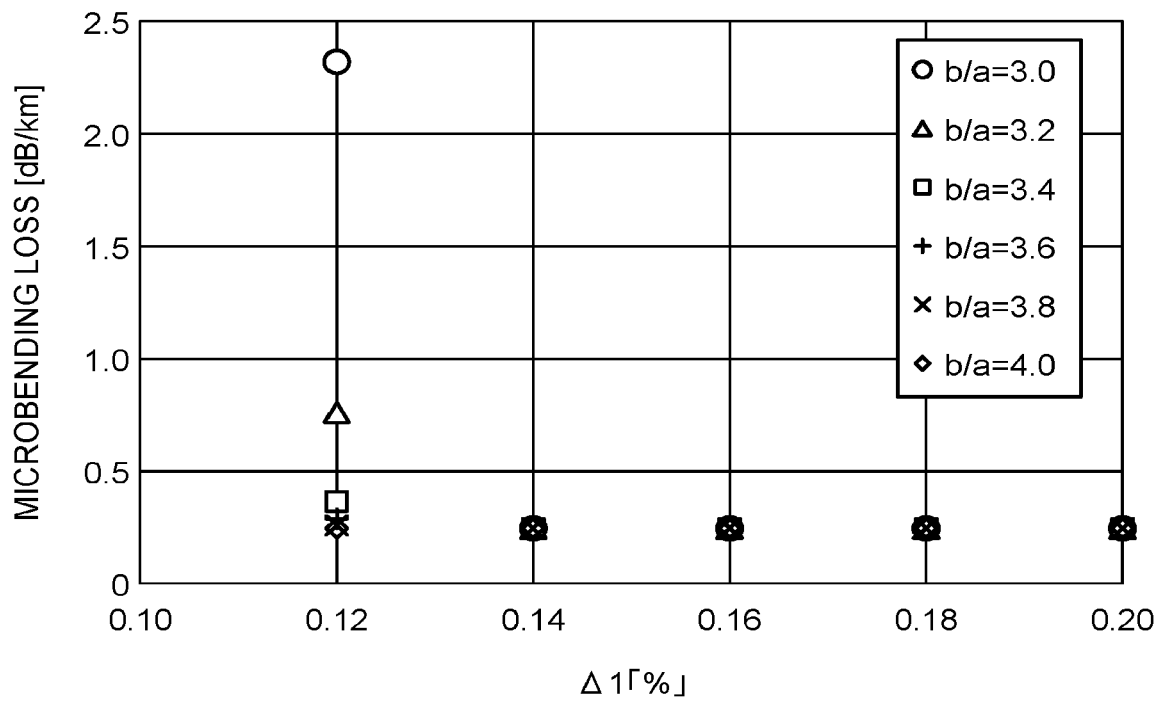
FIG. 7 is a graph illustrating an example of a relationship between Δ1 and microbending loss.

FIG. 7 is a graph illustrating an example of a relationship between $\Delta 1$ and the microbending loss. Note that the data of FIG. 7 shows that the core diameter $2a$ is adjusted to a range where Aeff is 125 $\mu m^2$ or more and 130 $\mu m^2$ or less, b/a is set to 3.0, 3.2, 3.4, 3.6, 3.8, and 4.0, and $\Delta 2$, which is the other structural parameter, is changed within a range of −0.27% or more and −0.12% or less. Here, the same $\Delta 1$ value takes different values of microbending loss depending on $\Delta 2$ values, and therefore, FIG. 7 illustrates an average value of microbending loss for the respective $\Delta 1$ values.

As can be seen from FIG. 7, particularly, in a range where b/a is small, as $\Delta 1$ decreases, the microbending loss increases even if $\Delta 2$ and other structural parameters are optimized. However, when $\Delta 1$ is 0.14% or more, a stable low microbending loss characteristic is maintained.

Figure 8:
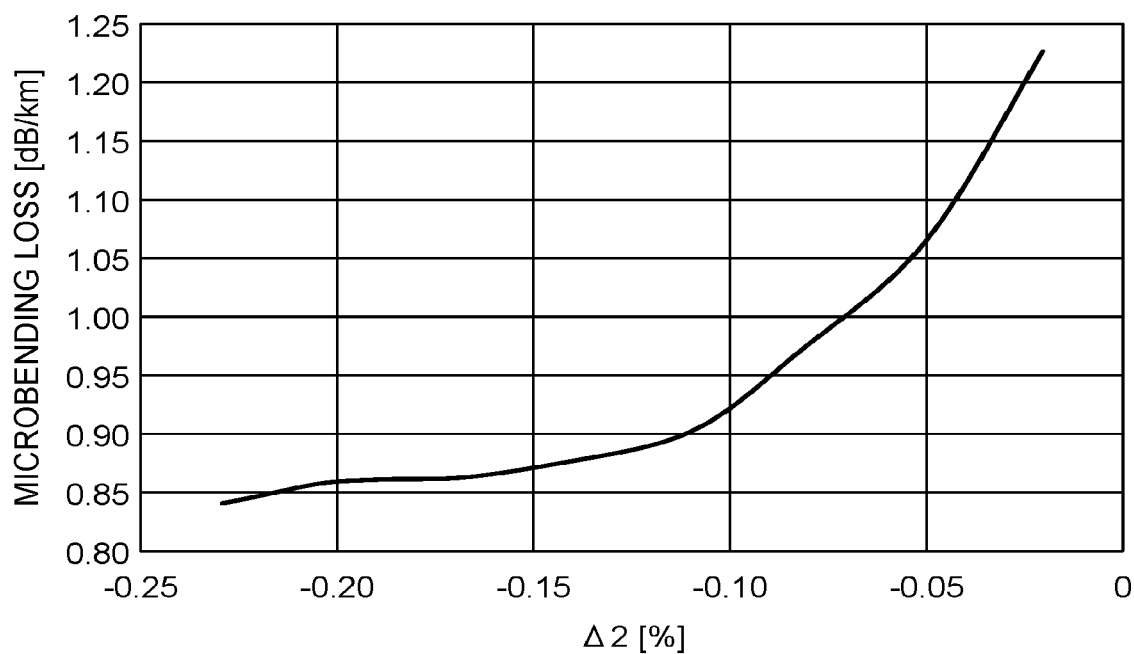
FIG. 8 is a graph illustrating an example of a relationship between Δ2 and the microbending loss.

Furthermore, FIG. 8 is a graph illustrating an example of a relationship between $\Delta 2$ and the microbending loss. Note that the data of FIG. 8 shows that the core diameter $2a$ is adjusted to a range where Aeff is 125 $\mu m^2$ or more and 130 $\mu m^2$ or less, $\Delta 1$ is changed within a range of 0.18% or more and 0.24% or less, and b/a is changed within a range of 3.0 or more and less than 4.0. Here, the same $\Delta 2$ takes different values of microbending loss depending on values of other structural parameters, and therefore, FIG. 8 illustrates an average value of microbending loss for the respective $\Delta 2$ values.

As can be seen from FIG. 8, in a range where $\Delta 2$ is larger than $-0.12\%$, the microbending loss rapidly increases and approaches 1.0 dB/km. Therefore, in order to stably achieve a microbending loss of 1.0 dB/km or less, $\Delta 2$ is preferably $-0.12\%$ or less. In order to further stably achieve a microbending loss of 0.90 dB/km or less, $\Delta 2$ is preferably $-0.14\%$ or less.

The present inventors conducted comprehensive examinations as described above, and have found combinations of the structural parameters satisfying the conditions that the cable cut-off wavelength is 1530 nm or less, Aeff is 105 $\mu m^2$ or more and 130 $\mu m^2$ or less and the bending loss is 1 dB/m or less, at the wavelength of 1550 nm, and the microbending loss is 1 dB/km or less.

Finally, a result of examination on the transmission loss will be described. First, some of the combinations of the structural parameters satisfying the conditions that the cable cut-off wavelength is 1530 nm or less, Aeff is 105 $\mu m^2$ or more and 130 $\mu m^2$ or less and the bending loss is 1 dB/m or less, at the wavelength of 1550 nm, and the microbending loss is 1 dB/km or less were selected, and optical fibers were produced experimentally, for examination. Note that the experimentally produced optical fibers were each manufactured according to a conventionally known method of manufacturing an optical fiber which will be described later. Furthermore, fluorine (F) was added to the cladding portion so that $\Delta$Clad has a negative value. In addition, a small amount of dopant was added to the core portion to obtain the refractive index substantially the same as that of the pure silica glass. In addition, the amount of dopant added to the core portion was changed to change $\Delta 1$.

Figure 9:
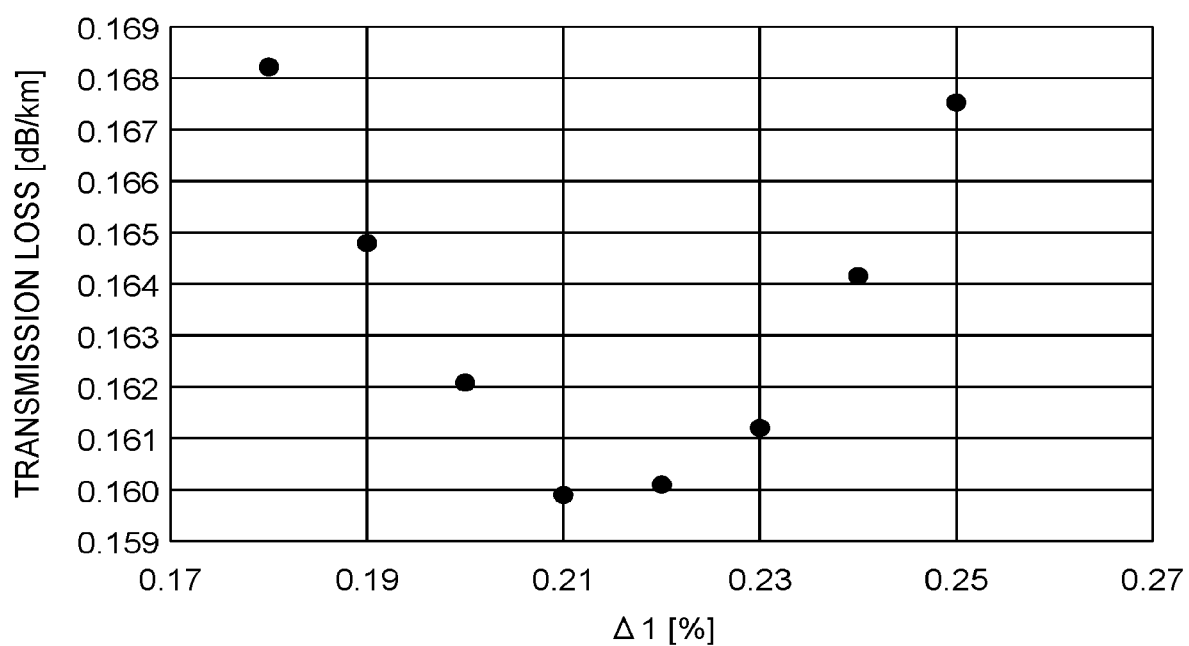
FIG. 9 is a graph illustrating an example of a relationship between Δ1 and transmission loss.

FIG. 9 is a graph illustrating an example of a relationship between $\Delta 1$ and the transmission loss. Here, the same $\Delta 1$ takes different values of transmission loss depending on the values of other structural parameters, and therefore, FIG. 9 illustrates an average value of transmission loss for the respective $\Delta 1$ values.

As can be seen from FIG. 9, it has been found that the transmission loss changes according to the change in $\Delta 1$ due to the change in the amount of the dopant, but when $\Delta 1$ is less than $0.18\%$, the loss increases due to the influences of the bending loss, the microbending loss, and the like, and when $\Delta 1$ is larger than $0.24\%$, the amount of F added to the cladding portion increases, and the viscosity of the cladding portion decreases, excessive stress is likely to be applied to the core portion, and the transmission loss is likely to increase.

Although the influence of the microbending loss on the transmission loss when $\Delta 1$ is low may be improved by further improvement of the resin characteristics of the coating layer, it is considered that there is still a limit. For that reason, it has been found that $\Delta 1$ is preferably $0.18\%$ or more and $0.24\%$ or less also from the viewpoint of the transmission loss. Furthermore, it has been found that $\Delta 1$ is preferably $0.19\% \leq \Delta 1 \leq 0.24\%$, in order to achieve a transmission loss of less than 0.165 dB/km.

As described above, the optical fiber 10 according to the embodiment achieves both of the single-mode characteristic and the low bending loss while appropriately expanding Aeff and further has the low microbending loss. Furthermore, as can be seen from FIG. 9, the optical fiber can have a transmission loss of 0.18 dB/km or less at the wavelength of 1550 nm.

Production Method

As the method of manufacturing the optical fiber 10, a known manufacturing method is desirably used to manufacture the optical fiber so as to satisfy the structural parameters described above or the characteristics of a resin layer. Specifically, the optical fiber 10 is readily manufactured by forming an optical fiber preform by a known method using a vapor axial deposition (VAD) method, outside vapor deposition (OVD) method, modified chemical vapor deposition (MCVD) method, plasma CVD method, or the like, drawing the glass optical fiber from the optical fiber preform in a drawing furnace, applying a resin to the drawn glass optical fiber, and irradiating the applied resin with ultraviolet light to cure the resin.

Note that the dopant such as Ge, F, K, or Na can be added to the optical fiber preform by using a gas containing the dopant upon synthesis of soot. In addition, glass may be doped with K or Na by using a gas phase method, an immersion method, or the like with the help of diffusion speed, not upon synthesis of the soot. Furthermore, Cl can be added to the optical fiber preform by using a residual chlorine gas remaining in a dehydration process. Furthermore, F can be added to the optical fiber preform by applying a fluorine gas flow in a vitrified sinter structure.

EXAMPLES

In an example, optical fibers of Sample Nos. 1 to 10 each having the W-shaped refractive index profile were manufactured by drawing the optical fiber preform manufactured using a VAD method. Note that in the W-shaped refractive index profile, the core portion was made of silica-based glass having a refractive index slightly higher or slightly lower than that of pure silica glass by adding at least one of Cl, K, Na, and F, and the cladding portion was made of silica-based glass to which F as the dopant to lower the refractive index was added. Each glass optical fiber was formed to have a diameter (clad diameter) of 125 $\mu m$. Each coating layer was formed to have a diameter of approximately 250 $\mu m$. Here, process conditions such as the VAD method and drawing were optimized every time according to a core dopant having been added to the core portion. For example, tension and the like upon drawing were optimized according to a drawing furnace temperature, drawing speed, and the like.

Next, the optical properties of the optical fibers of Sample Nos. 1 to 10 were measured. Here, the sandpaper method was employed for a measurement method for the microbending loss. In other words, a difference between the transmission loss of the optical fiber to be measured in the state A and the optical fiber in the state B was defined as the microbending loss. In the state A, the optical fiber having a length of 500 m is wound at a tension of 100 gf in a single layer around a fixed bobbin on which #1000 sandpaper is wrapped so that the optical fiber does not overlap, and in the state B, the optical fiber is coiled so that no lateral pressure is applied. Note that the measurement wavelength is 1550 nm.

The structural parameters and core dopants of the respective samples are shown in Table 1. Furthermore, the optical properties of the respective samples are shown in Table 2. Note that $\Delta 1'$ represents the average maximum relative refractive-index difference of each core portion to the refractive index of pure silica glass. The relative refractive-index difference of the average refractive index of each side core layer to the refractive index of pure silica glass is represented by $\Delta 2'$. Therefore, there is a relationship represented by $\Delta 1 = \Delta 1' - \Delta$Clad and there is a relationship represented by $\Delta 2 = \Delta 2' - \Delta$Clad. Furthermore, for the core dopant, for example, "Cl$_2$+K" means that doping with chlorine and potassium was performed.

As shown in Tables 1 and 2, for each of Sample Nos. 1 to 10, $\Delta 1$ was 0.18% or more and 0.24% or less, $\Delta 2$ was −0.27% or more and −0.12% or less, ($\Delta 1 - \Delta 2$) was 0.36% or more and 0.45% or less, and b/a was 2.5 or more and 5 or less. Furthermore, 2a was 12 μm or more and 13.9 μm or less.

In addition, for each of Sample Nos. 1 to 10, Aeff at the wavelength of 1550 nm was 105 μm$^2$ or more and 130 μm$^2$ or less, λcc was 1530 nm or less, and the bending loss at the wavelength of 1550 nm when bent at a diameter of 30 mm was 1 dB/m or less. Furthermore, for any of Sample Nos. 1 to 10, the transmission loss at the wavelength of 1550 nm was 0.18 dB/km or less, and the microbending loss at the wavelength of 1550 nm was 1 dB/km or less.

Specifically, for Sample No. 1, when $\Delta 1$ was 0.24%, $\Delta 2$ was −0.12%, ($\Delta 1 - \Delta 2$) was 0.36%, b/a was 2.8, 2a was 13.3 μm, and the core dopant was Cl$_2$, an Aeff of 122 μm$^2$, a λcc of 1416 nm, a bending loss of 0.58 dB/m, a transmission loss of 0.168 dB/km, and a microbending loss of 0.58 dB/km were obtained, and Sample No. 1 was a particularly preferable example from the viewpoint of a balance between manufacturability and good characteristics.

Furthermore, for Sample No. 2, when $\Delta 1$ was 0.23%, $\Delta 2$ was −0.15%, ($\Delta 1 - \Delta 2$) was 0.38%, b/a was 2.9, 2a was 13.3 μm, and the core dopant was Cl$_2$+K, an Aeff of 120 μm$^2$, a λcc of 1368 nm, a bending loss of 0.39 dB/m, a transmission loss of 0.152 dB/km, and a microbending loss of 0.36 dB/km were obtained, and Sample No. 2 was a particularly preferable example from the viewpoint of a balance between manufacturability and good characteristics.

Furthermore, for Sample No. 10, when $\Delta 1$ was 0.22%, $\Delta 2$ was −0.15%, ($\Delta 1 - \Delta 2$) was 0.37%, b/a was 2.5, 2a was 13.9 μm, and the core dopant was Cl$_2$+K+F, an Aeff of 130 μm$^2$, a λcc of 1510 nm, a bending loss of 0.16 dB/m, a transmission loss of 0.155 dB/km, and a microbending loss of 0.91 dB/km were obtained, and Sample No. 10 was a particularly preferable example from the viewpoint of a balance between manufacturability and good characteristics.

Note that the microbending loss has variation in value depending on the measurement method. Therefore, when the microbending loss, at the wavelength of 1550 nm, of a single-mode fiber (also referred to as standard SMF) that is normally used in optical communication defined in ITU-T G.652 was measured by the sandpaper method, the microbending loss was 0.1 dB/km to 0.2 dB/km. In other words, according to the sandpaper method, it can be said that Sample Nos. 1 to 10 have a microbending loss that is approximately 5 to 10 times that of the standard SMF. It can be said that the microbending loss at this level is at an appropriate level and does not affect the transmission loss so much. In addition, for example, even when measurement is performed by using another measurement method, if the microbending loss has a value of approximately 5 to 10 times the value of the standard SMF, it can be said that the microbending loss does not affect the transmission loss so much.

In addition, connection characteristics with other optical fibers and cable characteristics in use of a cable were also confirmed for any of the Sample Nos. 1 to 10, but there was no particular problem.

TABLE 1

| Sample No. | Δ1' | Δ2' | Δ Clad | Δ1 | Δ2 | Δ1 − Δ2 | b/a | 2a | Core dopant |
|---|---|---|---|---|---|---|---|---|---|
| Unit | % | % | % | % | % | % | | μm | |
| 1 | 0.12 | −0.24 | −0.12 | 0.24 | −0.12 | 0.36 | 2.8 | 13.3 | Cl2 |
| 2 | 0.13 | −0.25 | −0.1 | 0.23 | −0.15 | 0.38 | 2.9 | 13.3 | Cl$_2$ + K |
| 3 | 0.05 | −0.33 | −0.13 | 0.18 | −0.2 | 0.38 | 3.1 | 13.3 | Cl$_2$ + F |
| 4 | −0.06 | −0.44 | −0.27 | 0.21 | −0.17 | 0.38 | 3.7 | 12.3 | F |
| 5 | 0.12 | −0.27 | −0.1 | 0.22 | −0.17 | 0.39 | 2.7 | 12.7 | Cl$_2$ + Na |
| 6 | 0.03 | −0.36 | −0.19 | 0.22 | −0.17 | 0.39 | 2.7 | 13.6 | K |
| 7 | −0.02 | −0.38 | −0.2 | 0.18 | −0.18 | 0.36 | 3.8 | 13 | F + K |
| 8 | −0.04 | −0.41 | −0.25 | 0.21 | −0.16 | 0.37 | 2.7 | 13.2 | F + Na |
| 9 | 0.04 | −0.32 | −0.15 | 0.19 | −0.17 | 0.36 | 4.9 | 12 | K + Na |
| 10 | 0.05 | −0.32 | −0.17 | 0.22 | −0.15 | 0.37 | 2.5 | 13.9 | Cl$_2$ + K + F |

TABLE 2

| Sample No. | Aeff | λcc | Bending loss | Transmission loss | Microbending loss |
|---|---|---|---|---|---|
| Unit | μm$^2$ | nm | dB/m | dB/km | dB/km |
| 1 | 122 | 1416 | 0.58 | 0.168 | 0.58 |
| 2 | 120 | 1368 | 0.39 | 0.152 | 0.36 |
| 3 | 119 | 1328 | 0.91 | 0.165 | 0.39 |
| 4 | 108 | 1358 | 0.16 | 0.171 | 0.1 |
| 5 | 113 | 1364 | 0.18 | 0.163 | 0.27 |
| 6 | 126 | 1311 | 0.41 | 0.156 | 0.48 |
| 7 | 117 | 1502 | 0.19 | 0.154 | 0.21 |
| 8 | 119 | 1515 | 0.05 | 0.166 | 0.28 |
| 9 | 105 | 1528 | 0.03 | 0.158 | 0.21 |
| 10 | 130 | 1510 | 0.16 | 0.155 | 0.91 |

Note that the disclosure is not limited to the above embodiments. The disclosure also includes a configuration in which the above-described component elements are appropriately combined. In addition, further effects and modifications can be readily derived by those skilled in the art. Therefore, further wide aspects of the disclosure are not limited to the above embodiments, and various modifications can be made.

According to the disclosure, it is possible to achieve the optical fiber that achieves both of the single-mode characteristic and the low bending loss while appropriately increasing the effective core area.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber comprising:
   a core portion;
   a side core layer circumferentially surrounding the core portion;
   a cladding portion circumferentially surrounding the side core layer; and
   a coating layer circumferentially surrounding the cladding portion, wherein
   when an average maximum relative refractive-index difference of the core portion to an average refractive index of the cladding portion is Δ1, a relative refractive-index difference of an average refractive index of the side core layer to the average refractive index of the cladding portion is Δ2, a relative refractive-index difference of the average refractive index of the cladding portion to pure silica glass is ΔClad, Δ1>ΔClad>Δ2 and 0>Δ2 hold,
   the Δ1 is 0.18% or more and 0.24% or less,
   the Δ2 is −0.27% or more and −0.12% or less,
   (Δ1−Δ2) is 0.36% or more and 0.45% or less,
   when a core diameter of the core portion is 2a and an outer diameter of the side core layer is 2b, b/a is 2.5 or more and 5 or less,
   an effective core area at a wavelength of 1550 nm is 105 μm$^2$ or more and 130 μm$^2$ or less,
   a cable cut-off wavelength is 1530 nm or less, and
   a macrobending loss at a wavelength of 1550 nm when bent at a diameter of 30 mm is 1 dB/m or less.

2. The optical fiber according to claim 1, wherein the b/a is 3.9 or less.

3. The optical fiber according to claim 1, wherein the cable cut-off wavelength is 1500 nm or less.

4. The optical fiber according to claim 1, wherein a transmission loss at a wavelength of 1550 nm is 0.18 dB/km or less.

5. The optical fiber according to claim 1, wherein the ΔClad has a negative value.

6. The optical fiber according to claim 1, wherein the core portion does not include germanium.

7. The optical fiber according to claim 1, wherein a microbending loss at a wavelength of 1550 nm measured by a sandpaper method is 1.0 dB/km or less.

8. The optical fiber according to claim 1, wherein the 2a is 12 μm or more and 13.9 μm or less.

9. The optical fiber according to claim 1, wherein the Δ2 is −0.14% or less.

10. The optical fiber according to claim 1, wherein the Δ1 is 0.19%≤Δ1≤0.24%.

11. The optical fiber according to claim 1, wherein a transmission loss at a wavelength of 1550 nm is 0.165 dB/km or less.

* * * * *